Figure 1:
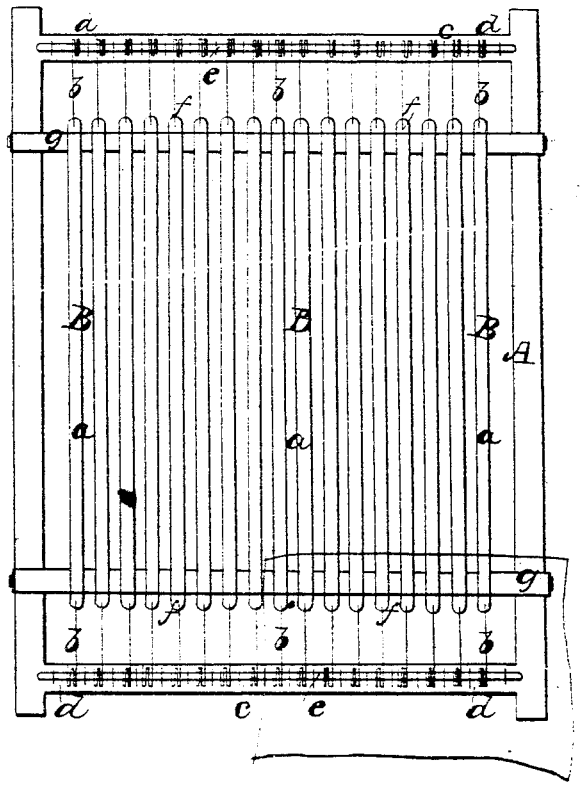
Figure 2:
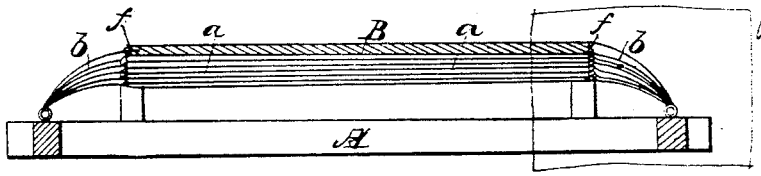
Figure 3:
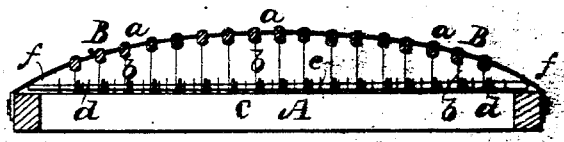

H. TUCKER.

BEST AVAILABLE COPY

Spring Bed Bottom.

A. I. No. 165.

A. I. Patented June 9, 1857.

N. PETERS, Photo-Lithographer, Washington, D. C.